United States Patent [19]
Pruitt et al.

[11] 3,963,690
[45] June 15, 1976

[54] POLYMERIZATION OF ETHYLENE IN STIRRED AUTOCLAVE WITH COOLED INNER WALL

[75] Inventors: Malcolm E. Pruitt, Midland, Mich.; Joe B. Lovett, Sweeny, Tex.

[73] Assignee: The Dow Chemical Company, Midland, Mich.

[22] Filed: Oct. 7, 1974

[21] Appl. No.: 512,642

[52] U.S. Cl. ............................ 526/65; 23/288 K; 526/66; 526/88; 526/352
[51] Int. Cl.² .................... C08F 4/28; C08F 110/02
[58] Field of Search ............... 260/94.9 R, 94.9 P

[56] References Cited
UNITED STATES PATENTS
3,756,996  9/1973  Pugh et al. .................. 260/94.9 R Primary Examiner—Alan Holler
Attorney, Agent, or Firm—Lester J. Dankert

[57] ABSTRACT

Polymerization of ethylene by free-radical initiation at high temperature and pressure in a stirred autoclave by continuous process is improved by means of cooling at inner wall in contact with polymerization reaction mixture and removing part of the exothermic heat of polymerization reaction by indirect heat transfer to heat exchange fluid.

1 Claim, 3 Drawing Figures

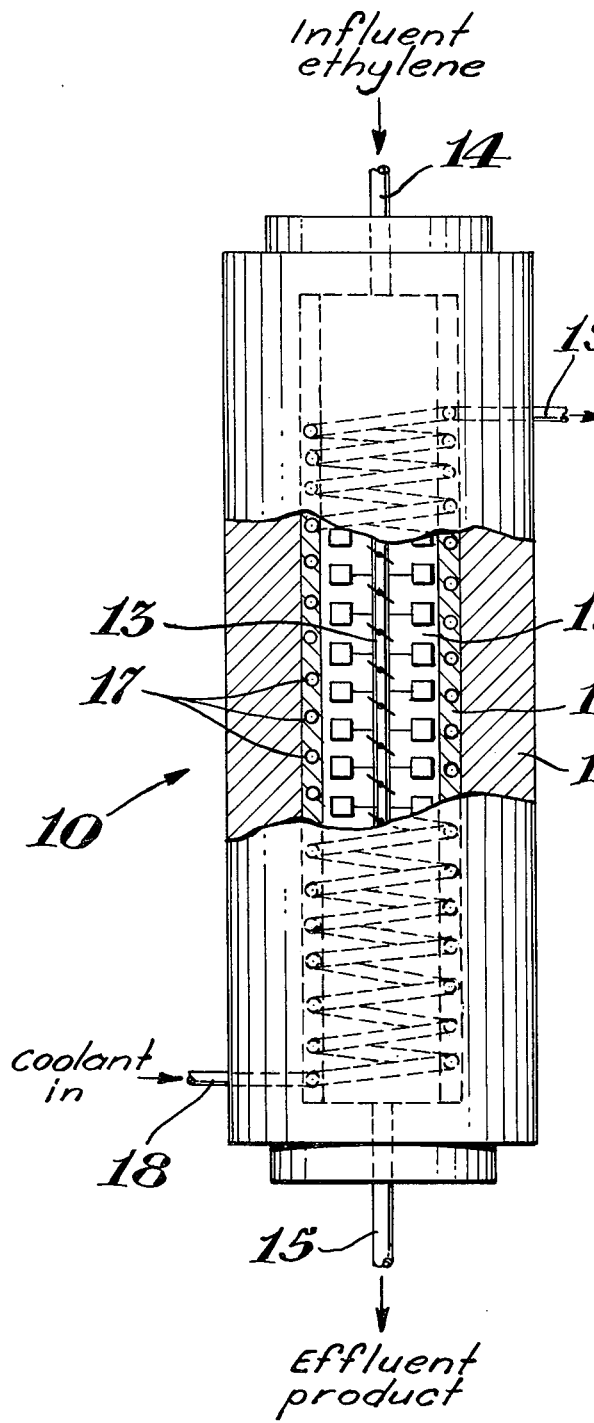
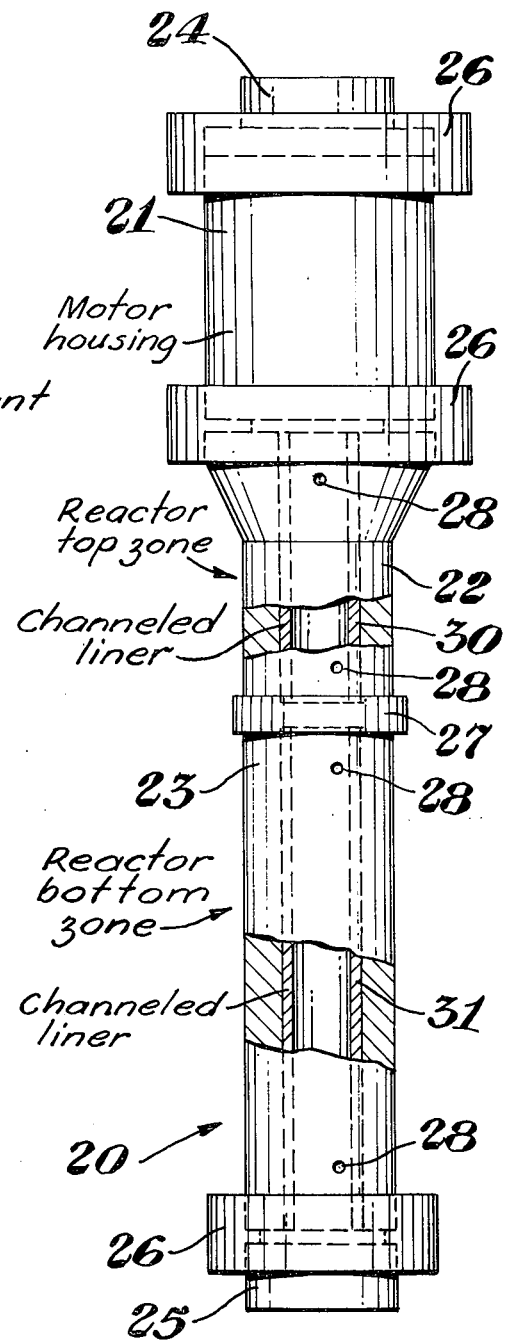

3,963,690

POLYMERIZATION OF ETHYLENE IN STIRRED AUTOCLAVE WITH COOLED INNER WALL

BACKGROUND OF THE INVENTION

This invention relates to the polymerization of ethylene by free-radical initiation at high temperature and pressure in a stirred autoclave by continuous process.

Such process has generally been known and practiced commercially for many years. It has been described in literature and patents, including "Polythene — The Technology and Uses of Ethylene Polymers" Edited by A. Renfrew and Phillip Morgan and published by Interscience Publishers, Inc., Second Edition, 1960, (especially pages 11–15) and "Encyclopedia of Polymer Science and Technology" Vol. 6, published (1967) by Interscience Publishers, Inc., section entitled "Ethylene Polymers" pages 275 et seq., especially under the heading "Polymerization . . . High-Pressure, Free-Radical Processes", pages 278–281.

In general, operation of the stirred autoclave continuous process involves continuously feeding to the autoclave streams comprising ethylene and free-radical initiator and optionally polymerizable comonomer, diluent, chain transfer agent, telogen or other additive. The temperature of the feed materials must be raised in the reaction zone to the "light-off" or activation temperature, which depends somewhat on the kind of free-radical initiator selected, whereupon polymerization commences. The polymerization reaction of ethylene is strongly exothermic (heat of reaction about 800–850 cal/g); if no heat loss occurs, the temperature of the reaction mixture rises about 12–13 Centigrade degrees for each one percent of ethylene polymerized. Moreover, as the temperature rises, the activation of the initiator increases and the rate of polymerization increases. The prospect for rapid runaway of the reaction with explosive potential is high. In the usual operation of stirred autoclaves, the reaction is controlled in part by carrying out the process in a continuous manner and selecting the feed materials, temperatures and rates of feed thereof, and rate of flow of reaction mixture through the autoclave (residence time) such that conversion of ethylene to polymer is in the order of about 12 to 14 percent, thereby limiting the temperature rise.

It may be hypothesized that, if some of the heat of reaction could be withdrawn from the reaction mixture in the reaction zone, a larger conversion could be obtained within a given temperature rise (or a lesser temperature rise be experienced for a given conversion). However, in the case of autoclave polymerization of ethylene, it has been thought that heat removal was impractical. The very high pressures in the range of 15,000 to 20,000 psi (1055 to 1406 kg/sq. cm) or more require very heavy, thick sidewalls, in the case of commercial sized autoclaves, walls of steel several inches thick. Heat flow through such thick walls is negligible. Moreover, it was also hypothesized that, if an autoclave sidewall or internal part were drastically chilled in attempt to increase rate of heat transfer from the exothermic reaction mixture, the reaction mixture in immediate contact with such chilled surface could congeal, form an insulating layer and frustrate the cooling; also that the layer of reaction mixture proximate the chilled surface could be cooled below optimum reaction temperature.

In the case of low pressure polymerization of ethylene, e.g. in solution in hydrocarbon liquid medium with catalysts such as activated chromium oxide deposited on porous silica-alumina, there is described in U.S. Pat. No. 3,681,308 reactor apparatus having heat exchange (cooling) surfaces, but the apparatus is not adapted for high pressure, free-radical initiated polymerization of ethylene.

It is an object of this invention to provide means in the art of polymerizing ethylene at high temperatures and pressures with free-radical initiation in a stirred autoclave whereby to remove from the reaction mixture in the autoclave part of the exothermic heat of reaction by indirect heat transfer to a heat exchange fluid.

Other objects and advantages of the invention will be evident from the description that follows.

SUMMARY OF THE INVENTION

The objects of this invention are attained by polymerizing ethylene under free-radical initiating conditions and in continuous manner at high temperature and pressure in a stirred autoclave and continuously removing part of the exothermic heat of polymerization from the polymerization reaction mixture in the autoclave by indirect heat exchange through a heat exchange wall of the autoclave having an inner surface in contact with the polymerization reaction mixture to heat exchange fluid passing through channels provided within the heat exchange wall of the autoclave near the inner surface thereof.

In one aspect, the invention provides improvement in apparatus means for polymerization of ethylene. In another aspect, the invention provides improvement in process means for polymerization of ethylene.

BRIEF DESCRIPTION OF DRAWING

FIG. 1 is a schematic representation, partly cut away, of one embodiment of autoclave reactor having channels for passage of coolant in an internal heat exchange wall.

FIG. 2 is a schematic representation, partly cut away, of another embodiment of autoclave reactor with top and bottom reaction zones, each of which is provided with a liner channeled for passage of coolant.

Figure 3:
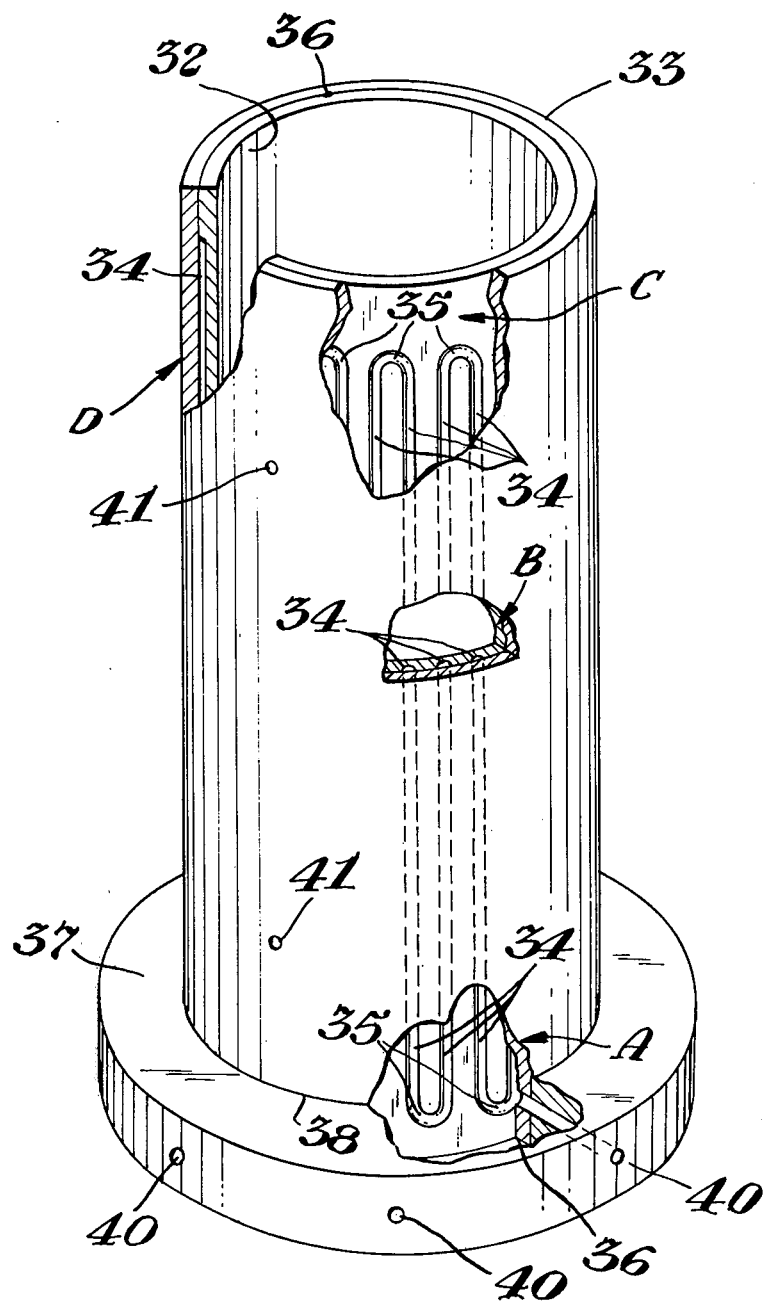
FIG. 3 is a schematic representation, partly cut away, of one embodiment of channeled liner for the autoclave of FIG. 2.

The drawing figures are not necessarily to scale, and elements of apparatus and details not necessary to understanding the invention are omitted for clarity.

DETAILED DESCRIPTION AND EMBODIMENTS

The invention herein described is an improvement in the art of polymerizing ethylene in a stirred autoclave under free-radical conditions at high temperature and pressure, i.e. at pressure of at least 500 atmospheres, generally between 1,000 and 3,000 atmospheres, and at temperatures, usually from about 125° to about 325°C, at which ethylene addition polymerization is sustained without decomposition. Although heat alone or with small amounts of molecular oxygen can provide free-radical initiation, it is well known and commonplace to employ free-radical initiating additives such as organic peroxygen and azo compounds and azines, amine oxides, oximes, etc. in the polymerization of ethylene. Typical and illustrative, but not exhaustive, examples of suitable initiators are diisopropyl and di-t-butyl peroxydicarbonates and other such peroxydicarbonates, t-butyl peracetate, t-butyl peroxypivalate, t-butyl peroctoate, t-butyl perbenzoate and other alkyl peroxycarboxylates, di-lauroyl peroxide, dibenzoyl peroxide, acetyl peroxide, and other diacyl peroxides, di-t-butyl peroxide and other dialkyl peroxides, methyl ethyl ketone peroxide, dicumyl peroxide and other diaryl peroxides, cumene hydroperoxide, t-butyl hydroperoxide and other organo hydroperoxides, 2,2-di-t-butylperoxy butane, acetyl cyclohexanesulfonylperoxide, azobisisobutyronitrile, 2,2′-azobis(2,4-dimethylvaleronitrile), methylazoisobutyrate, azines such as benzalazine and oximes such as acetone oxime. Such materials are often supplied and usually used in mixure with solvents and diluents which reduce their hazard, and they are preferably used in liquid form, usually dilute, which facilitates feeding and controlling the rate of feeding the initiator to the reactor. Suitable diluents are benzene, ethylbenzene, toluene, xylene, cumene, cyclohexane, octane, nonane, decane and various $C_6$ to $C_{12}$ alkane mixtures, mineral oils and other liquid hydrocarbons, acetone, methyl ethyl ketone, 2-hexanone, acetophenone, dimethyl phthalate, butyl benzyl phthalate and other liquid esters, methylene chloride, ethylene dichloride, o-dichlorobenzene, and the like.

In accordance with this invention, an autoclave reactor of the kind provided with motor driven agitator and adapted for continuous polymerization of ethylene in the presence of free-radical initiator and under conditions of high pressure and temperature is modified. The modification provides in the reaction zone or zones at least one heat exchange, i.e., heat conductive, wall having an inner surface in contact with the reaction mixture contained in the autoclave reactor when in use, and provides in the heat exchange wall near the inner surface thereof at least one channel for the passage therethrough of coolant fluid.

In one embodiment shown in FIG. 1 of the drawing, a typical ethylene polymerization, high pressure autoclave reactor 10 has a heavy sidewall body 11 enclosing a reaction zone space 12 containing a rotatable agitator 13 driven by means not shown, means generally indicated at 14 for introduction of ethylene into the reaction zone and means for removal of reaction mixture product generally indicated at 15. Other conventional means such as means for introducing initiator and other additaments and additional ethylene at various locations in the reaction zone, for sensing temperature and pressure, for initial heating of the reactor at start-up, for safe release of pressure in emergency, are of course also provided but not shown. Likewise, all of the customary and conventional appurtenances for supplying the necessary reactants and for handling the effluent product have been omitted from the drawing for clarity.

The autoclave reactor 10 is provided with an inner wall 16 which contains channels 17 for passage of coolant introduced as at inlet port 18 and leaving as at outlet port 19.

In one embodiment, channels 17 are provided by metal tubing embedded in metal constituting wall 16. Tubing of copper, brass, steel, aluminum or other suitable metal or alloy of metals is arranged in one or more sections from inlet to outlet. In one embodiment such tubing is embedded in wall 16 by silver soldering or brazing or like melting of lower melting alloy to fully surround the tubing. The shape and size of the tubing forming channels 17 and the nature and thickness of wall 16 should be selected to provide adequate strength and resistance to collapse under the pressures exerted by the reaction mixture in space 12. Wall 16 should be closely supported by the body 11 of the autoclave; in one embodiment, the wall 16 is adhered by melt soldering or brazing to the internal surface of body 11; in another embodiment, the wall 16 is machined to a cylinder closely fitting a cylindrical cavity in body 11. In such embodiments, the tubing constituting channels 17 can be arranged in any desired configuration, e.g. one or more spiral coils, hairpin reverse loops or serpentine or other arrangements, from one or more inlet ports 18 to one or more outlet ports 19, or with internal headers connecting a plurality of channels to one inlet and/or outlet port; the inlet and outlet ports can be located in any convenient part of the assembly, usually but not necessarily at opposite ends of the reaction zone, such as by holes bored through the autoclave body or through the collars, flanges, caps etc. by which the parts of the autoclave are separably secured together.

In another embodiment represented by FIGS. 2 and 3, the channels are provided in a removable liner.

FIG. 2 is a schematic representation of an autoclave reactor 20 for high pressure continuous polymerization of ethylene in two zones. Accessory equipment is omitted from the drawing for clarity. The autoclave is in general an elongated cylindrical apparatus which includes a motor section 21 housing a motor driving an axially disposed agitator not shown which runs through the length of the reactor space of the autoclave, a top zone reactor body 22, a bottom zone reactor body 23, a top closure 24, bottom closure 25 and other appropriate appurtenances. Each of the reactor body sections 22 and 23 has a cylindrical bore fitted with a liner 30 and 31, respectively, (further described hereinafter) defining a reaction space. The several parts of the main body of the autoclave are assembled and held together by conventional coupling devices 26, e.g. threaded collars called reactor nuts with compression rings and seals. A unit 27 provides an intermediate bearing for the axial agitator shaft and a baffle defining the top reaction zone from the bottom reaction zone. In operation, ethylene is fed into the reactor through the top end fitting 24 and optionally one or more additional entry ports 28 in reactor body 22 and/or 23, initiator is also fed through one or more of such entry ports, and polymerization is initiated and sustained in the reaction zones. The resulting reaction mixture passes through the reactor top zone 22 into and through the reactor bottom zone 23 and out the reactor bottom fitting 25 for separation and recovery of polymer in conventional fashion.

The channeled liners 30 and 31 are shown in more detail in FIG. 3. Each of the liners is in general an annular right cylinder with a circular annular flange at one end.

In the embodiment depicted in FIG. 3, the liner is constructed of two tightly fitting concentric cylinder sleeves, an inner sleeve 32 and an outer sleeve 33. Before assembling the sleeves together, an even number of equally spaced grooves 34 are provided in the outer surface of the inner sleeve 32, e.g. by machining or grinding, such grooves running generally parallel to the axis of the cylinder and extending near but not to the ends of the sleeve as shown in cutaways A, B, C and D. Cross grooves 35 shown in cutaways A and C connect the ends of pairs of adjacent longitudinal grooves in alternate fashion thereby forming one continuous serpentine groove in the outer surface of inner sleeve 32. Outer sleeve 33 fits tightly over the inner sleeve and closes the interconnected grooves 34 and 35 to form channels.

The ends of the sleeves 32 and 33 are welded together at 36 and to the circular annular flange 37 at 38. Flange 37 is adapted to be sealed between the end of the reactor body and the adjacent part in the reactor nut or coupling 26 shown in FIG. 2.

Flange 37 also has holes 40 bored therein radially from the outer periphery through the body of the flange and through the contiguous wall of outer sleeve 33, each of which holes intersects and connects with one of the grooves 35 as shown in cutaway A. At least two holes 40 are provided and usually evenly spaced and together with interconnected grooves 34 and 35 form a channel or channels for passage of coolant. In the embodiment shown, alternate ones of holes 40 can be used as coolant inlet ports and the others of holes 40 are then coolant outlet ports. In use, the liner of FIG. 3 is fitted tightly into the cylindrical cavity of the corresponding autoclave body section as shown in FIG. 2 with the liner flange sealed in the assembly 26. The part 26 is provided with openings in register with holes 40 of flange 37 for access of appropriate service lines for handling the coolant.

It will be obvious that the number, shape and pattern of channels provided by the grooves 34 and 35 and the arrangement of ports 40 can be varied as desired. In one variation, channel grooves are provided in the inside of the outer sleeve 33 and are closed with a tightly fitting plain inner sleeve. In another, channel grooves are provided in both sleeves.

In fabricating sleeves 30 and 31 for use in accordance with FIGS. 2 and 3, any structural metal can be used, provided that the inside surface of inner sleeve 32 is suitable for contact with the ethylene polymerization reaction mixture. Usually, it is advantageous to make all components of the liners of the same material, e.g. steel alloy, as the main body of the autoclave so as to minimize any problems associated with coefficients of expansion.

It is customary in the design of the autoclave bodies for use in ethylene polymerization in this art to provide a number of small openings (e.g. 28 referring to FIG. 2) through the heavy side wall of the autoclave into the reactor space for the introduction of streams of initiator and optionally streams of polymerizable comonomer, diluent, chain transfer agent, telogen or other additive or secondary streams of ethylene, or for access to the reactor space of temperature sensing devices or other instruments and the like. Accordingly, the cooling wall member of this invention likewise includes any such openings. Thus, referring to FIGS. 2 and 3, liner 30 and/or 31 may have one or more small holes 41 passing through both sleeves of the liner wall while avoiding channels 34 and 35 therein. Any such opening 41 would also be positioned to align with corresponding opening 28 in the autoclave body when the liner is in place.

The inner surface of the heat exchange wall in contact with the reaction mixture in the autoclave can be smooth, e.g. cylindrical, or it can be fabricated to increase the area of heat transfer surface such as by providing therein corrugations or grooves.

In practicing the method of this invention, ethylene is polymerized under free-radical initiating conditions and in continuous manner in an autoclave reactor means modified as described whilst removing part of the exothermic heat of polymerization from the polymerization reaction mixture. Such removal of heat from the reaction mixture is accomplished by passing heat exchange fluid through the specified and described channels in the heat exchange wall of the autoclave and near the surface of such wall, which surface is in contact with the reaction mixture.

Water is a convenient and satisfactory heat exchange fluid for this purpose, but other liquid or gaseous heat exchange fluids can be used, such as aqueous salt solutions, ethylene glycol, eutectic mixture of diphenyl and diphenyloxide, isomeric terphenyl mixtures, o-dichlorobenzene, various other halohydrocarbons, oils and like liquids or air, nitrogen, steam or other gas. Treated water containing algaecide and corrosion inhibitor is preferred.

The starting temperature and rates of flow of the heat transfer fluid are selected to remove a substantial amount of heat through the heat exchange wall without causing polyethylene to solidify on the wall surface. That is, the temperature profile through the heat exchange wall should be such that the inner surface in contact with the polymerization reaction mixture is at a temperature not below about 120° and preferably not below about 150°C.

The primary benefit of the substantial removal of heat from the reaction mixture through the heat exchange wall to the heat transfer fluid flowing in the channels in the wall is the increase in productivity which the improved process permits without reaching dangerously high temperatures in the reaction mixture. For instance, in a typical autoclave polymerization of ethylene at feed rate of 4000 pounds (1814 kg.) per hour producing polyethylene at rate of 500 pounds (227 kg.) per hour (12.5% conversion) without cooling, the removal of heat at the rate of about 75,000 BTU's per hour (about 18,900 kilogram-calories per hour) in accordance with this invention, with increase of catalyst and of polymerization rate, without significant change in reaction zone temperatures, enables making polyethylene at rate of 550 pounds (about 250 kg.) per hour (13.7% conversion) for an increase of about 10% in productivity of the autoclave polymerizer. Depending on the particular characteristics of the autoclave and the operating conditions used to make a given ethylene polymer product, increases in productivity of 20 percent or more can be obtained.

As might be expected, small changes in some properties of the ethylene polymer product are observed when the autoclave reaction is carried out in accordance with this invention; these probably result, not from the heat removal step per se, but because of attendant changes in the flow pattern of reaction mixture within the reactor space, changes in the temperature profiles within the reaction zone, changes in stirring and shear rate, and perhaps changes in ratio of polymer made in the several reaction zones where the autoclave has two or more such zones. In some comparative trials, it has been observed that the molecular weight distribution of the polymer product was slightly broader, density and tensile strength were slightly lower, melt tension was slightly higher, and impact and tear strength were not affected by the heat removal modification.

The following examples illustrate the invention in several embodiments, but are not to be taken as limiting its scope. In the examples, parts and percentages are by weight unless otherwise identified.

EXAMPLE 1

A small experimental autoclave reactor for ethylene polymerization was modified in accordance with this invention. The autoclave, suggested by FIG. 1 of the drawing, was a heavy-walled vessel enclosing a cylindrical space about 3 inches (about 7.6 cm) in diameter and about 18 inches (about 22.9 cm) long containing a motor-driven axial agitator shaft having numerous small paddle stirrers radially disposed on the shaft. The autoclave was fitted with the usual appurtenances for feeding thereto ethylene and initiator, for removing reaction mixture product, for observing temperature and pressure, and for safety.

For the present purposes, the autoclave was fitted with a special liner fabricated to contain a helical coil of small diameter schedule 304 stainless steel seamless tubing. The tubing was 0.090 inch (about 2.3 mm) O.D. with 0.018 inch (about 0.46 mm) side wall, was coiled around a thin stainless steel sleeve into a cylindrical helix generally conforming to the inside diameter and length of the autoclave chamber, and was embedded in silver solder fused and solidified to form a solid cylindrical wall fitting into the autoclave and enveloping the tubing. The ends of the tubing were arranged to pass through the end seal of the autoclave body and were connected to means for pumping cooling water through the tubular channel provided by the tubing in the silver solder wall.

In a test run for purposes of control without cooling water flow in the tubing channel, ethylene was fed to the autoclave at average rate of about 35 pounds (about 15.9 kg) per hour together with a small stream of solution of approximately 2% tertiary butyl peroxide in mixture of equal parts benzene and hexane, the peroxide being a free-radical initiator of polymerization of ethylene. The reaction conditions were "lined out" at pressure of about 20,000 psig (about 1406 kg-cm$^{-2}$) and temperature of polymerization reaction mixture of about 250°C at the discharge from the autoclave. The resulting effluent reaction mixture contained an average of about 13% polyethylene, i.e. conversion of about 13% of monomer fed.

When water at about room temperature was pumped through the tubing at rate of about 120 pounds (about 54.4 kg) per hour, it was found necessary to increase the rate of feeding the peroxide initiator solution into the autoclave in order to maintain the temperature of the effluent reaction product, and, when the reaction was "lined out", the effluent reaction product was found to contain an average of about 18% polyethylene, i.e. an increase in productivity of about 40%.

EXAMPLE 2

In the tests of this example, there was used an autoclave schematically shown in FIG. 2 of the drawing. The autoclave had inside dimensions of about 7 inches (about 17.8 cm) diameter by about 6 feet (about 183 cm) long, and was divided by an annular baffle into top and bottom zones about 2 and 4 feet (about 61 and 122 cm) long, respectively. The autoclave was fitted with an axial agitator shaft running substantially the length of the reaction space and carrying numerous radially disposed paddle stirrer blades. The autoclave was equipped with the usual appurtenances and means for feeding ethylene and initiator at several points in each reaction zone, for removing reaction mixture product from the bottom of the bottom zone, for observing temperatures, pressures, flow rates, etc. and for controlling the same, for safety, and for recovering polymer from the effluent reaction mixture and for recycling unreacted recovered ethylene.

For the purposes of this invention, the autoclave was fitted with liners in top and bottom zones as shown schematically in FIGS. 2 and 3 of the drawing. Each liner was constructed of Series 1020 steel in the form of two cylinders, an inner and an outer cylinder, each with walls about 0.5 inch (about 1.27 cm) thick, the inner fitting snugly within the outer cylinder. The outer diameter of the outer cylinder was machined to slip closely into the autoclave chamber.

In each liner, the outer surface of the inner cylinder was machined to provide 32 longitudinal grooves of ⅛ inch (about 3.2 mm) radius and ⅛ inch (about 3.2 mm) depth equally spaced on the circumference of the cylinder and running parallel to each other nearly to the ends of the cylinder where alternate ones of the longitudinal grooves were connected by curved grooves of similar dimensions to provide "hair-pin" turns and to connect the grooves in serpentine fashion.

The inner surface of each inner cylinder was also machined with grooves in the nature of "rifling", a system of square-cut grooves, about ¼ inch (about 6.4 mm) deep and ¼ inch (about 6.4 mm) wide, with ¼ inch (about 6.4 mm) spacing therebetween, spiralling down the cylinder at an angle of about 11° in the same direction as the flow of stirred reaction mixture was expected to take through the autoclave.

The outer cylinder was slipped over the inner one to enclose the grooves in the outer side of the inner cylinder thereby forming a serpentine channel between the cylinders, and the ends at one end of the composite cylinders were welded together. The other ends of the composite cylinders were welded to an annular flange through a central opening therein, the flange being about 2 inches (about 5.1 cm) thick and about 15 inches (about 38 cm) O.D. Eight small holes were drilled radially and equidistant in the flange, midway between its faces, from the outer rim of the flange inwardly through the outer of the cylinders to communicate with the serpentine channel between the cylinders.

Other holes were also placed in the composite cylinders in position aligned with openings in the autoclave wall while avoiding the serpentine cooling channel grooves between the cylinder elements.

The liners so constructed were placed in the autoclave with the composite cylinders fitting into the autoclave barrel and the flanges being disposed and sealed into the closure assemblies whereby the autoclave barrel was secured to the top and bottom devices, respectively. The reactor nut closure assemblies were also modified by holes bored there-through to allow access to the radial holes in the flanges of the liners, whereby coolant feed lines and drains were connected so that, in each liner, four alternate holes were used as inlets for coolant fluid leading to the serpentine channel in the liner wall and the other four alternate holes in each liner flange were used as outlets for such fluid from the liner channel. Pump and control means were then connected to the coolant inlet lines to cause water to flow into and through the liner channels.

In a series of runs denominated Tests A through T and further detailed in Table I, ethylene was polymerized in continuous manner in the autoclave just described. In each run, ethylene was pumped into the autoclave at a constant rate as shown in Table I, and the resulting reaction mixture was continuously removed from the bottom of the bottom zone of the autoclave through a pressure-actuated valve set to maintain pressure within the autoclave in the order of 22,000 psig as more specifically shown in Table I. In the case of Test runs A through L, isobutane was also fed to the autoclave at rate of about 3 to 5% based on the ethylene fed, to serve as telogen. For similar purpose, in the case of Test runs M through T, propylene was fed to the autoclave at rate of about 1 to 3% based on the ethylene. In each run, free-radical initiator was also fed to each zone of the autoclave.

The initiator fed to the Top Zone of the autoclave was t-butyl peroctoate in the form of 4% solution in liquid solvent at rate to maintain the temperature of the polymerization reaction mixture in such zone at about 375°–380° F. as more specifically shown in Table I. The liquid solvent was an isoparaffin distillate fraction boiling from and just above isooctane.

The initiator fed to the Bottom Zone of the autoclave was t-butyl peracetate in the form of 2% solution in the same isoparaffin liquid solvent at rate to maintan the temperature of the polymerization reaction mixture in that zone at about 465°–470° F. in Tests A through L and at about 450°–453° F. in Tests M through T as more specifically shown in Table I.

In carrying out Tests A through T, variation was made in the flow of water to and through the channels of the channeled liners of the autoclave at rates shown in Table I in gallons per minute. It will be observed in Table I that each group of four successive Tests starting with Tests A, E, I, M and Q, respectively, constitutes a set of comparisons wherein the first Test of each set is a control run, with no cooling water flow in either channeled liner; the succeeding tests of each set are runs with water coolant fed to the Bottom Zone only, Top Zone only, and to both Zones, respectively, at the recorded rates and temperatures of such water at inlet and outlet.

In each Test, the run was continued until an equilibrium or steady state was attained when the data were collected, and the effluent reaction product mixture was separated to collect the resulting ethylene polymer product. Table I also shows for each Test, the average rate of production of ethylene polymer product in pounds per hour and the percent conversion calculated from such polymer production rate and the ethylene feed rate. For each of the Test runs with cooling in accordance with this invention, Table I also shows under "Remarks" the increase, calculated as percentage, of polymer production rate for such run over the polymer production rate of the control run.

Data as to some of the properties of the polymer products of Tests A through T are shown in Table II.

TABLE I

| Test | $C_2H_4$ No./Hr | Reactor Conditions Press. ×10⁻³psig | Temp. °F Top | Temp. °F Bottom | Top Zone Rate gpm | Top Zone Temp °F In | Top Zone Temp °F Out | Bottom Zone Rate gpm | Bottom Zone Temp °F In | Bottom Zone Temp °F Out | Polymer Product Rate No./Hr | Conversion % | Remarks |
|---|---|---|---|---|---|---|---|---|---|---|---|---|---|
| A | 3760 | 22.0 | 379 | 464 | none | — | — | none | — | — | 485 | 12.9 | Control |
| B | 3760 | 22.0 | 380 | 465 | none | — | — | 5 | 101 | 141 | 550 | 14.6 | 13% over A |
| C | 3760 | 22.0 | 380 | 468 | 10.0 | 95 | 145 | none | — | — | 525 | 14.0 | 8% over A |
| D | 3760 | 22.2 | 375 | 463 | 9.5 | 95 | 110 | 4 | 95 | 135 | 580 | 15.4 | 20% over A |
| E | 2738 | 22.0 | 376 | 467 | none | — | — | none | — | — | 390 | 14.2 | Control |
| F | 2738 | 22.2 | 379 | 470 | none | — | — | 2 | 115 | 190 | 440 | 16.0 | 13% over E |
| G | 2738 | 22.0 | 378 | 469 | 7 | 90 | 100 | none | — | — | 420 | 15.4 | 8% over E |
| H | 2738 | 22.2 | 379 | 469 | 7 | 91 | 100 | 2 | 91 | 175 | 450 | 16.5 | 15.5% over E |
| I | 4800 | 22.2 | 378 | 465 | none | — | — | none | — | — | 650 | 13.5 | Control |
| J | 4800 | 22.0 | 380 | 471 | none | — | — | 2 | 110 | 185 | 725 | 15.1 | 11% over I |
| K | 4800 | 22.0 | 376 | 470 | 3 | 85 | 100 | none | — | — | 690 | 14.4 | 6% over I |
| L | 4800 | 22.0 | 374 | 462 | 6 | 72 | 91 | 4 | 72 | 112 | 700 | 14.6 | 8% over I |
| M | 3760 | 22.1 | 379 | 451 | none | — | — | none | — | — | 500 | 13.3 | Control |
| N | 3760 | 22.3 | 377 | 450 | none | — | — | 3 | 105 | 140 | 535 | 14.2 | 7% over M |
| O | 3760 | 22.0 | 383 | 453 | 10 | 94 | 120 | none | — | — | 530 | 14.1 | 6% over M |
| P | 3760 | 22.0 | 383 | 453 | 9 | 88 | 104 | 3 | 88 | 156 | 590 | 15.7 | 18% over M |
| Q | 4800 | 22.0 | 385 | 450 | none | — | — | none | — | — | 550 | 11.5 | Control |
| R | 4800 | 22.0 | 381 | 451 | none | — | — | 3.5 | 95 | 140 | 640 | 13.3 | 16.4% over Q |
| S | 4800 | 22.0 | 380 | 450 | 8 | 84 | 95 | none | — | — | 640 | 13.3 | 16.4% over Q |
| T | 4800 | 22.1 | 381 | 451 | 10 | 78 | 87 | 4.5 | 78 | 112 | 660 | 13.7 | 20% over Q |

TABLE II

| Test | Water Coolant | Dens. g/cc | Melt Index "E" | Melt Tension (a) | Swell % (b) | Tensile Strength psi. |
|---|---|---|---|---|---|---|
| A | none | 0.9233 | 22.03 | 1.15 | 45.5 | 1225 |
| B | bottom | .9219 | 23.72 | 1.19 | 52.7 | 1175 |
| C | top | .9218 | 23.91 | 1.19 | 53.9 | 1190 |
| D | both | .9221 | 23.72 | 1.29 | 56.4 | 1220 |
| E | none | .9228 | 22.0 | 1.25 | 47.9 | 1575 |
| F | bottom | .9218 | 21.8 | 1.27 | 51.5 | 1505 |
| G | top | .9221 | 19.1 | 0.85 | 41.5 | 1415 |
| H | both | .9219 | 20.7 | 1.28 | 50.3 | 1515 |
| I | none | .9228 | 24.0 | 1.23 | 50.3 | 1635 |
| J | bottom | .9226 | 26.4 | 1.04 | 52.7 | 1520 |
| K | top | .9225 | 22.9 | 1.27 | 49.1 | 1445 |
| L | both | .9228 | 19.5 | 1.48 | 52.7 | 1440 |
| M | none | .9204 | 1.68 | 5.42 | 53.9 | 1540 |
| N | bottom | .9197 | 1.96 | 5.33 | 50.3 | 1625 |
| O | top | .9198 | 1.85 | 6.14 | 53.9 | 1595 |
| P | both | .9196 | 1.65 | 7.72 | 50.3 | 1655 |
| Q | none | .9201 | 2.27 | 6.15 | 53.9 | 1585 |
| R | bottom | .9198 | 2.38 | 6.42 | 53.9 | 1510 |
| S | top | .9196 | 2.10 | 6.58 | 53.9 | 1570 |
| T | both | .9195 | 2.03 | 6.70 | 57.6 | 1545 |

(a) Melt tension is the force in grams required to draw out a strand from the Melt Indexer at 190°C at a rate of about 26 ft. per min in Tests A through L and at a rate of about 15.7 ft. per min in Tests M through T.
(b) Increase as percent that the diameter of the strand extruded from the Melt Indexer is larger than the diameter (0.0825 inch) of the orifice of the Melt Indexer.

Other variations of the invention will be evident to those skilled in the art from the foregoing description.

The advantages of the invention are also obtained in polymerizing ethylene together with one or more other ethylenically unsaturated polymerizable monomers to make copolymers. By the term "polymerizing ethylene" herein is meant to include polymerizing ethylene alone or together with one or more copolymerizable monomers optionally in the presence of telogen, chain transfer agent, diluent or other additive, under the specified conditions.

What is claimed is:

1. In a process of polymerizing ethylene under free-radical initiating conditions and in continuous manner at pressure of at least about 500 atmospheres and temperatures between about 125° and about 325°C at which the exothermic reaction of addition polymerization of ethylene is sustained without decomposition in a stirred autoclave comprising a relatively thick sidewall capable of withstanding the reaction pressure and defining at least one polymerization reaction zone, said continuous manner comprising continuously feeding ethylene to the reaction zone while stirring the resulting polymerization reaction mixture therein and continuously removing therefrom a portion of the resulting polymerization reaction mixture and sustaining the polymerization reaction in a substantially steady state, the improvement wherein the polymerization reaction zone is bounded in part by a relatively thin heat conductive wall means having a first surface in contact with the polymerization reaction mixture contained in that zone and a second surface near to the first surface but separated therefrom by said heat conductive wall, the said heat conductive wall means being supported by the said autoclave sidewall and lying between said autoclave sidewall and the said polymerization reaction zone, the dimensions of said heat conductive wall means and said autoclave sidewall being thin and thick, respectively, relative to each other, and the process is carried out while passing a heat exchange fluid in contact with said second surface, said heat exchange fluid being at a temperature below that of the polymerization reaction mixture, thereby removing part of the heat generated by the exothermic polymerization reaction occurring in the reaction zone from the reaction mixture therein through the said heat conductive wall means to the said heat exchange fluid.

* * * * *